US011130206B2

(12) United States Patent
Stottlemyer, Jr.

(10) Patent No.: US 11,130,206 B2
(45) Date of Patent: Sep. 28, 2021

(54) DECOUPLER TOOL

(71) Applicant: Big Woods Rescue Products, LLC, Poolesville, MD (US)

(72) Inventor: Walter U. Stottlemyer, Jr., Poolesville, MD (US)

(73) Assignee: Big Woods Rescue Products, LLC, Poolesville, MD (US)

(*) Notice: Subject to any disclaimer, the term of this patent is extended or adjusted under 35 U.S.C. 154(b) by 112 days.

(21) Appl. No.: 16/411,366

(22) Filed: May 14, 2019

(65) Prior Publication Data

US 2019/0351515 A1 Nov. 21, 2019

Related U.S. Application Data

(60) Provisional application No. 62/671,849, filed on May 15, 2018, provisional application No. 62/768,673, filed on Nov. 16, 2018.

(51) Int. Cl.
*B23P 19/04* (2006.01)
*A62C 33/00* (2006.01)
*F16L 37/107* (2006.01)

(52) U.S. Cl.
CPC ............. *B23P 19/04* (2013.01); *A62C 33/00* (2013.01); *F16L 37/107* (2013.01)

(58) Field of Classification Search
CPC ........ B23P 19/04; A62C 33/00; F16L 37/107; F16L 37/248; B25B 27/16
See application file for complete search history.

(56) References Cited

U.S. PATENT DOCUMENTS

| | | | |
|---|---|---|---|
| 2,798,393 A | 7/1957 | Currin | |
| 4,236,733 A | 12/1980 | Zambrano | |
| 4,648,630 A | 3/1987 | Bruch | |
| 4,856,834 A | 8/1989 | Lancaster et al. | |
| 5,000,405 A | 3/1991 | Rybak et al. | |
| 5,515,593 A | 5/1996 | Eagler | |
| 6,899,001 B1 * | 5/2005 | Sanders | B25G 1/04 81/125 |
| 7,497,405 B2 | 3/2009 | Huo | |
| 7,874,034 B1 | 1/2011 | Mack et al. | |
| 9,518,690 B2 | 12/2016 | Belisle | |
| 9,895,562 B2 | 2/2018 | Richardson | |
| 2009/0211034 A1 | 8/2009 | Lionel | |

* cited by examiner

*Primary Examiner* — Jason L Vaughan
(74) *Attorney, Agent, or Firm* — Breiner & Breiner, L.L.C.

(57) ABSTRACT

A decoupler tool for decoupling a Storz coupler is disclosed having a base member and handle and decoupler member attached to the base member. The handle and decoupler member may include two handles and each handle includes vertical leg having a protrusion for engaging a coupling lug or coupling lock release member of a Storz coupler.

17 Claims, 11 Drawing Sheets

DECOUPLER TOOL

RELATED APPLICATIONS

This application claims benefit of U.S. provisional application Ser. No. 62/671,849, filed May 15, 2018, entitled "Decoupler Tool;" and U.S. provisional application Ser. No. 62/768,673, filed Nov. 16, 2018, entitled "Decoupler Tool;" each of these applications incorporated herein by reference in their entirety.

FIELD OF THE INVENTION

The present invention relates to a decoupler tool for couplers used on supply line fire hoses. More particularly, the invention relates to a decoupler tool for use with a Storz coupler.

BACKGROUND OF THE INVENTION

Fire trucks carry a supply line hose and an attack line hose. FIG. 1 shows the back of a fire truck carrying a supply line hose SH. The supply line hose is attached to a fire hydrant and attached to a fire truck. The water from the fire hydrant is pumped through the supply line hose to the fire truck and from the fire truck to an attack line hose which is used to fight the fire. The fire truck usually carries about 2,000 feet of supply line hose. For every 50 to 100 foot section of the supply line hose, there is a coupling at each end of the hose. These couplings connect the hose sections and form a coupler and allow for a supply line hose up to about 2,000 feet, e.g. requiring 20 couplers. The couplers are known as "Storz" couplers, Storz being the generic name of the hose coupler. Mr. Storz invented the coupler and patented it in the United States in 1893, U.S. Pat. No. 489,107 which is incorporated herein by reference. Most fire trucks use a four inch diameter hose. These hoses will move about 800 gallons of water a minute. The diameter of the couplings is about 6 inches. In rural areas, certain fire trucks will use a five inch diameter hose because it carries more water. However, these hoses have very large diameter couplings and are difficult to use. The present invention described hereafter will work with both four inch and five inch diameter hoses.

Referring to FIG. 2, the Storz coupler comprises two couplings, namely a first coupling FC and a second coupling SC. Each coupling includes a larger diameter ring LDR and a smaller diameter ring SDR having a lock release member LR and a plurality of lugs L. Attached to the coupling is an adapter A to which a supply hose SH is attached. The coupler is released manually with a firemen grasping each coupling and lifting the lock release member LR as shown in FIG. 3. The problem is that for firemen, and including women, with small hands it is difficult to grasp both the couplings at the same time and pull open the lock release member and turn the coupling to separate the hose. This is also made more difficult because, unless the couplings are new, they are often difficult to open because of wear and tear.

When a fire truck arrives to a fire, the driver remains at the truck. The driver is required to decouple the Storz coupler. If he cannot do so, he must wait for another fire fighter to show up. This can be dangerous and slows down the fighting of a fire. For example, in one known instance, the fire truck driver had to stop an ambulance driver to help with the release of the coupler, i.e. each person taking grasp of one coupling and each person opening the coupling lock release member and turning of the coupling.

There are Spanner wrenches known which will release a Storz coupling. However, the Spanner wrench may be specific to a specific brand Storz couplings, and there are a number of different brand Storz couplings on the market. Accordingly, the Spanner wrench may not work on multiple hoses having different brand Storz couplings. While the Spanner wrenches are carried on fire trucks, firemen usually do not often use them.

Accordingly, there is a need in the fire fighter industry for a device for decoupling a Storz coupler. This need is addressed by the present invention.

SUMMARY OF THE INVENTION

A primary object of the present invention is to provide a decoupler tool for decoupling a Storz coupler.

Another primary object of the present invention is to provide a decoupler tool for decoupling a Storz coupler which is simple in construction and easy to use.

Another primary object of the present invention is to provide for a decoupler tool which is sturdy, will provide substantial longevity in use, is virtually indestructible and is easy for a fireman to use.

Another primary object of the present invention is to provide a decoupler tool for a coupler wherein the hose coupling may be placed in the decoupler tool in any orientation and allow for decoupling of the coupler.

Another primary object of the present invention is to provide a decoupling tool for decoupling a Storz coupler which is simple in construction, easy to manufacture and inexpensive to manufacture.

Another primary object of the present invention is to provide a tool for coupling as well as decoupling Storz couplers.

The decoupler tool of the present invention comprises a decoupler tool for decoupling a Storz coupler having first and second couplings each coupling having a plurality of lugs and a lock release member. The tool comprises a base member and a handle and decoupler member attached to the base member. The handle and decoupler member extends upwardly from the base member and comprises at least two handles. Each of the handles includes a vertical leg member having a protrusion adapted to engage a lug or a lock release member of one of the couplings of the Storz coupler. The decoupler tool may also be used to couple a Storz coupler.

The present invention is also directed to a method of using the decoupler tool.

These primary and other objects of the invention will be apparent from the following description of the preferred embodiments of the invention and from the accompanying drawings.

BRIEF DESCRIPTION OF THE DRAWINGS

The following detailed description of the specific non-limiting embodiments of the present invention can be best understood when read in conjunction with the following drawings, where like structures are indicated by like reference numbers.

Referring to the drawings.

DETAILED DESCRIPTION OF THE PREFERRED EMBODIMENTS

Figure 1:
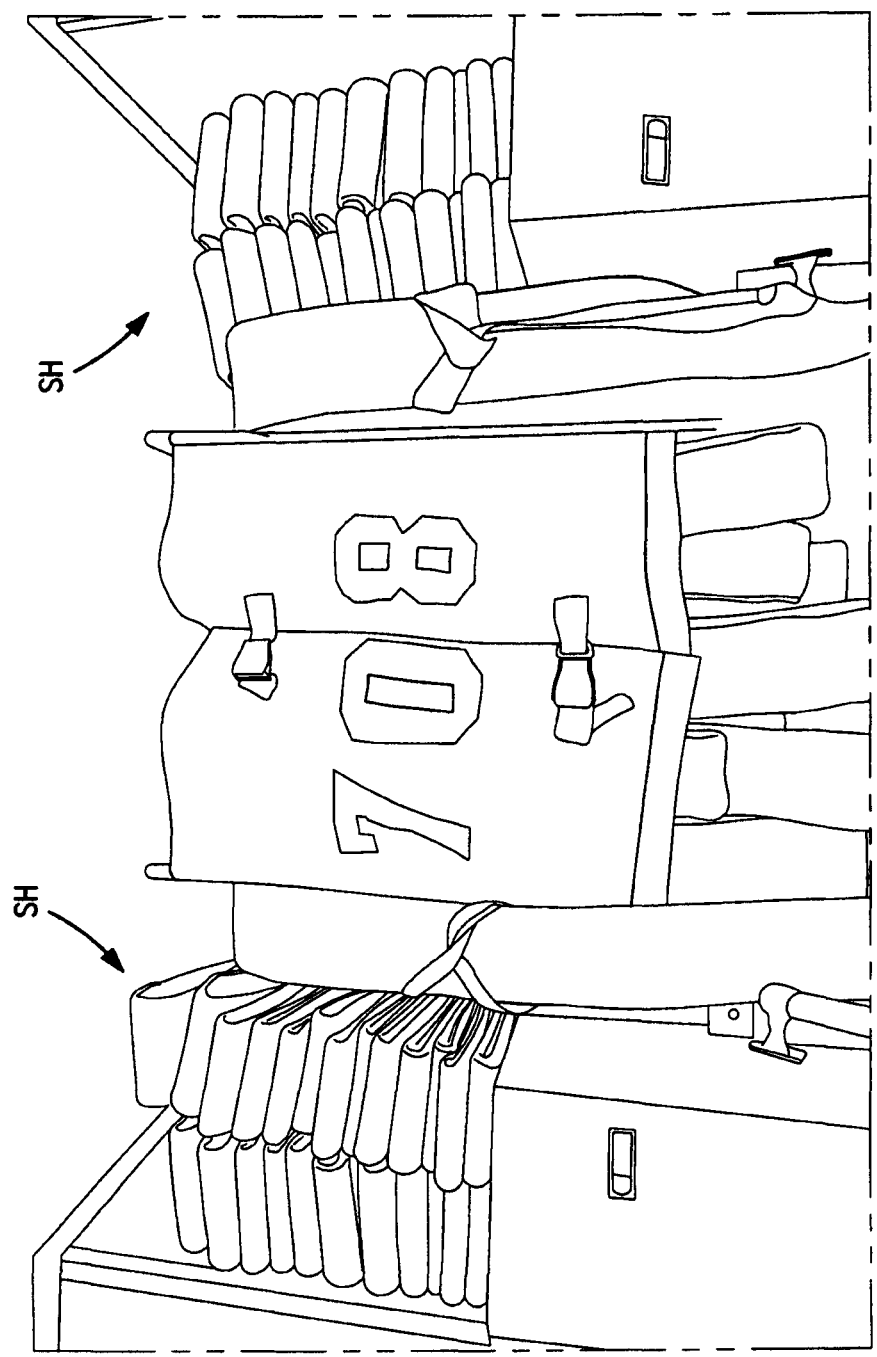
FIG. 1 shows a fire truck carrying a supply line hose.
Figure 2:
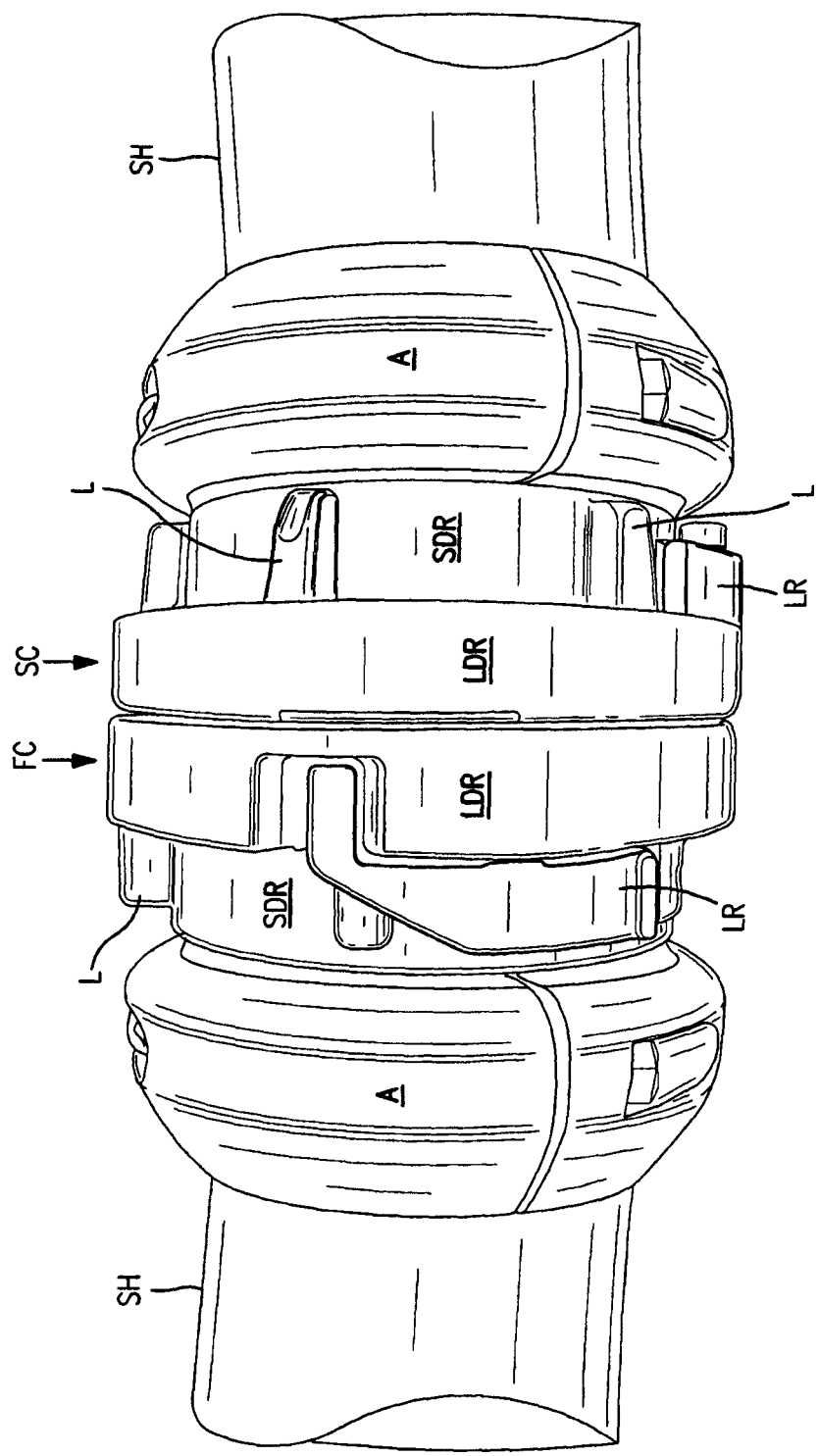
FIG. 2 shows a Storz coupler.
Figure 3:
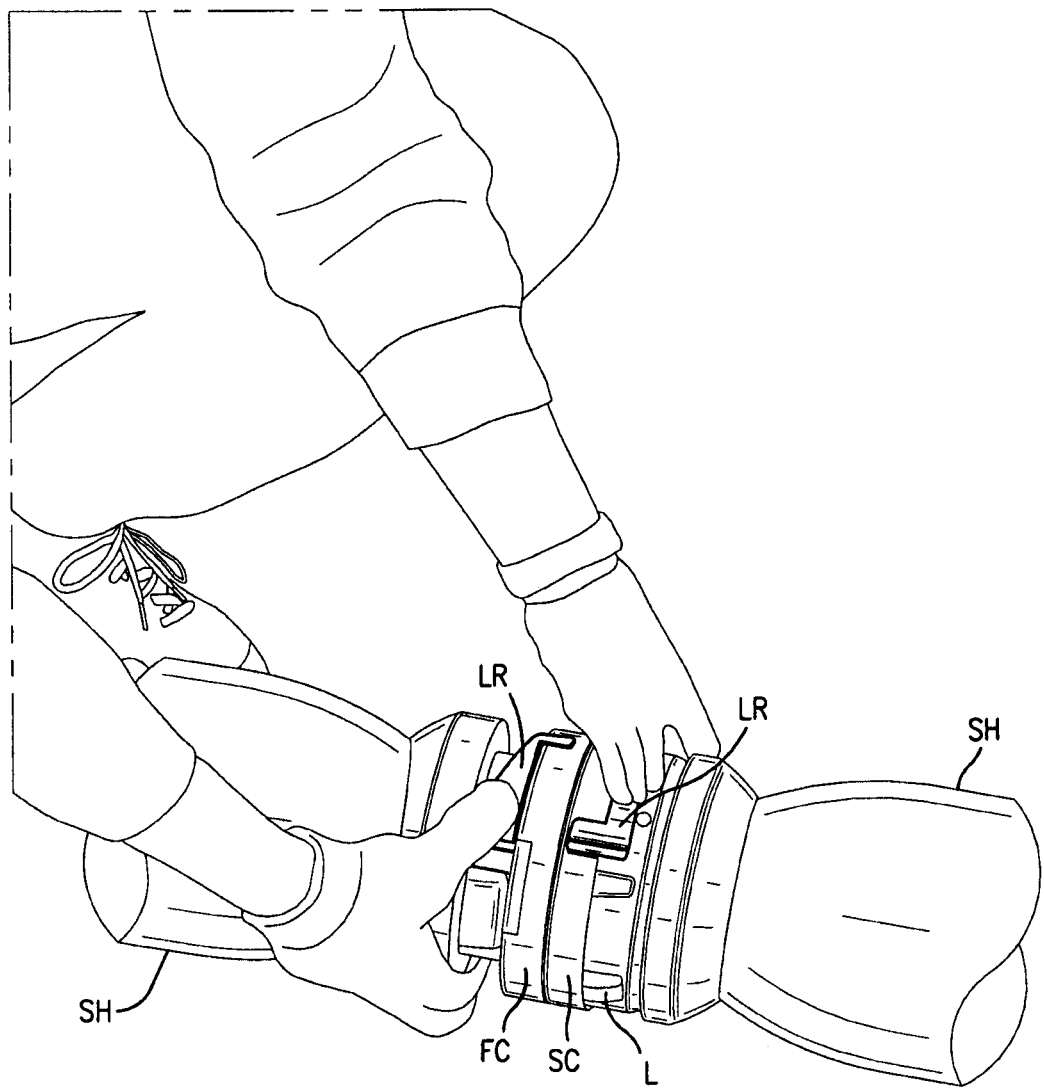
FIG. 3 shows a Storz coupler being manually decoupled.
Figure 4:
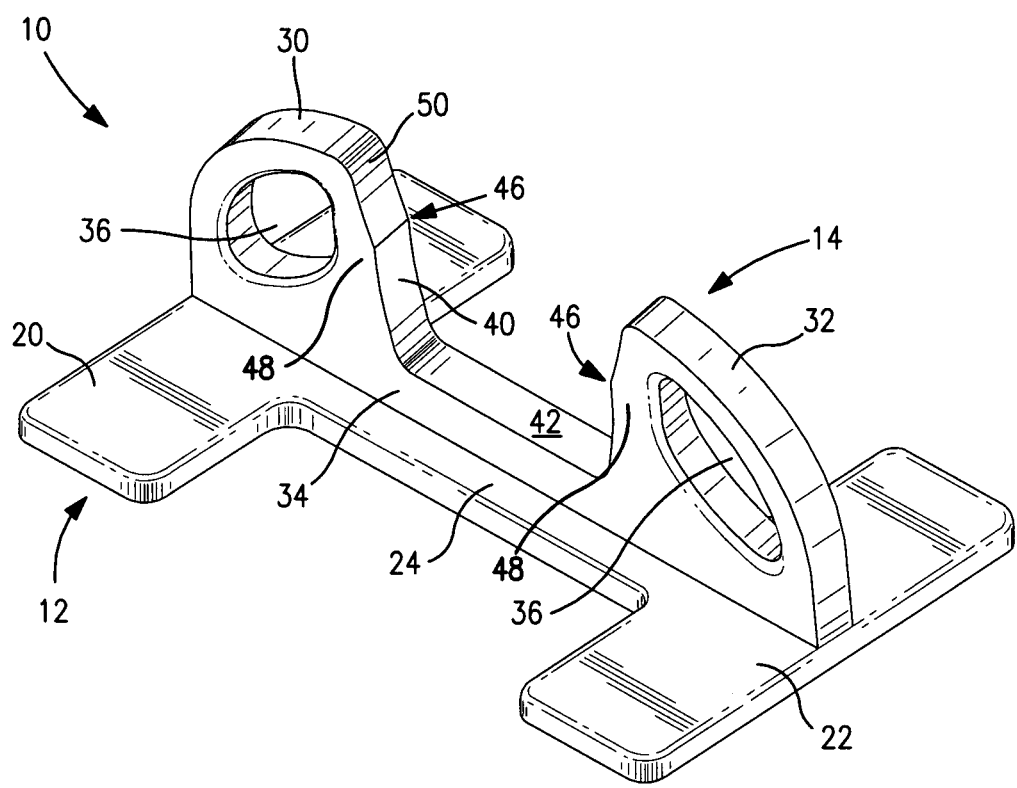
FIG. 4 shows a perspective view of the decoupler tool of the present invention.
Figure 5:
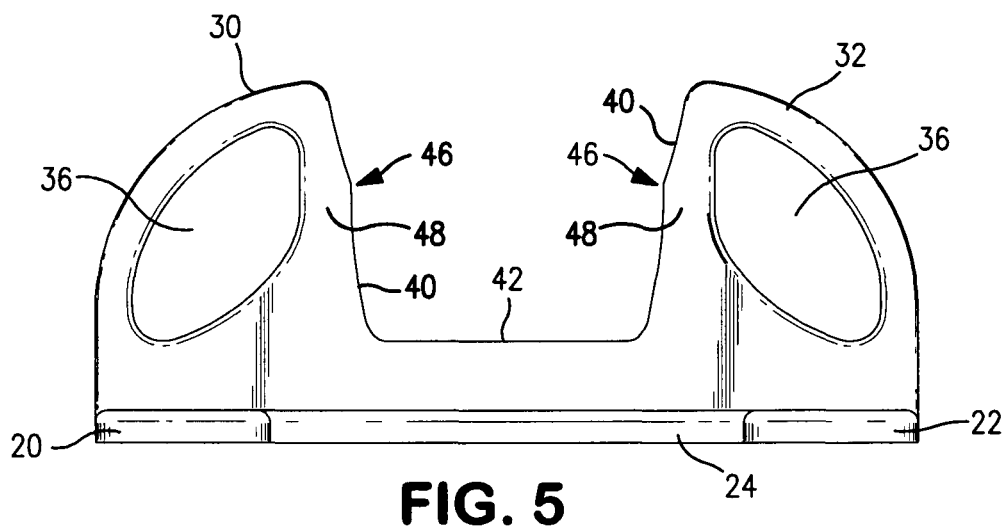
FIG. 5 shows a side view of the decoupler tool of FIG. 4.
Figure 6:
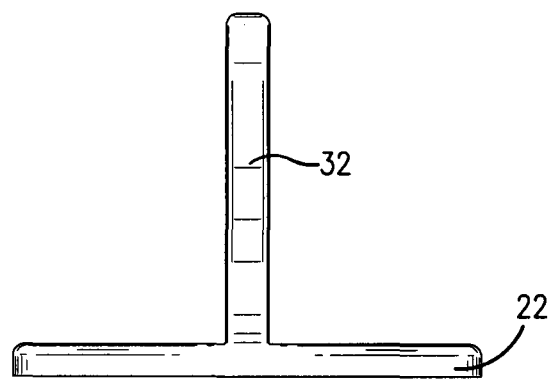
FIG. 6 shows an end view of the decoupler tool of FIG. 4.
Figure 7:
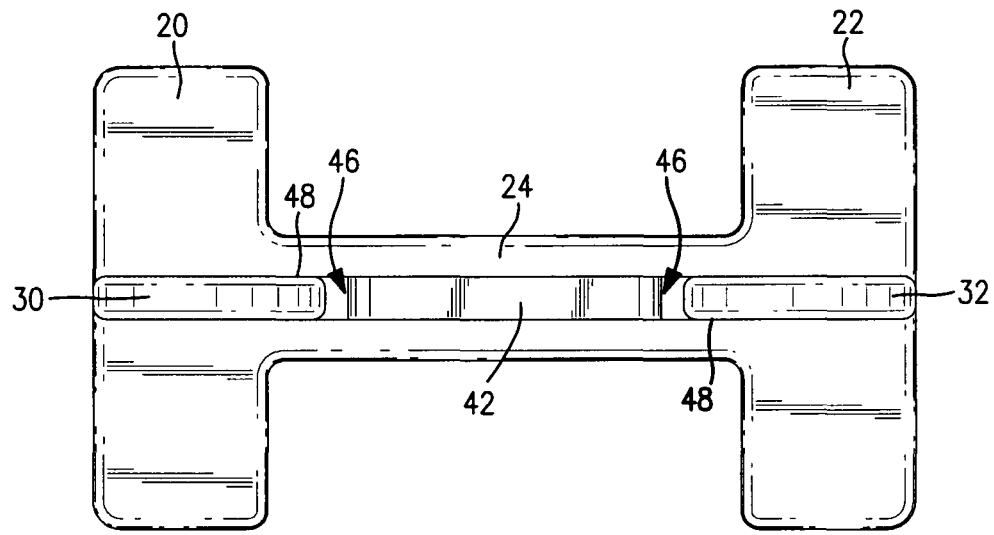
FIG. 7 shows a top view of the decoupler tool of FIG. 4.
Figure 8:
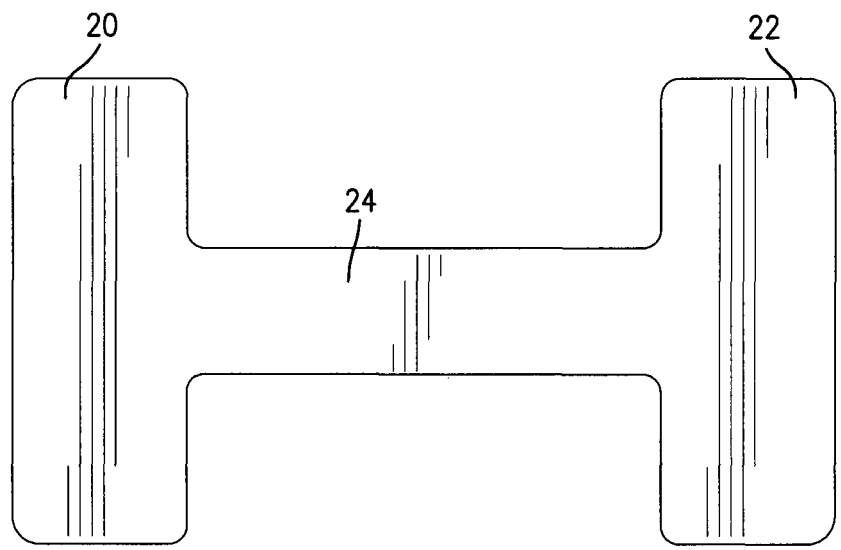
FIG. 8 shows a bottom view of the decoupler tool of FIG. 4.

The present invention is directed to a decoupler tool for decoupling (or coupling) a Storz coupler. The decoupler tool is simple and easy to use. The decoupler tool is sturdy and virtually indestructible and can be carried on a fire truck and used by one fireman to decouple a Storz coupler in a very short period of time. The decoupler tool solves the problem of the difficulty in the field of decoupling a Storz coupler and will save firemen substantial time in decoupling a Storz coupler. The decoupler tool of the present invention is simple in construction, easy to manufacture and inexpensive to manufacture.

Referring to FIGS. 4-9, there is shown a decoupler tool 10. The decoupler tool 10 generally includes an I-shaped base 12 and a handle and decoupler 14. The decoupler tool will now be described in further detail.

The I-shaped base 12 includes a first end 20, a second end 22 and a connecting portion 24 connecting first and second ends 20 and 22. The I-shaped base will provide support for the handle and decoupler 14 and will usually be placed on the ground when using the decoupler.

Figure 9:
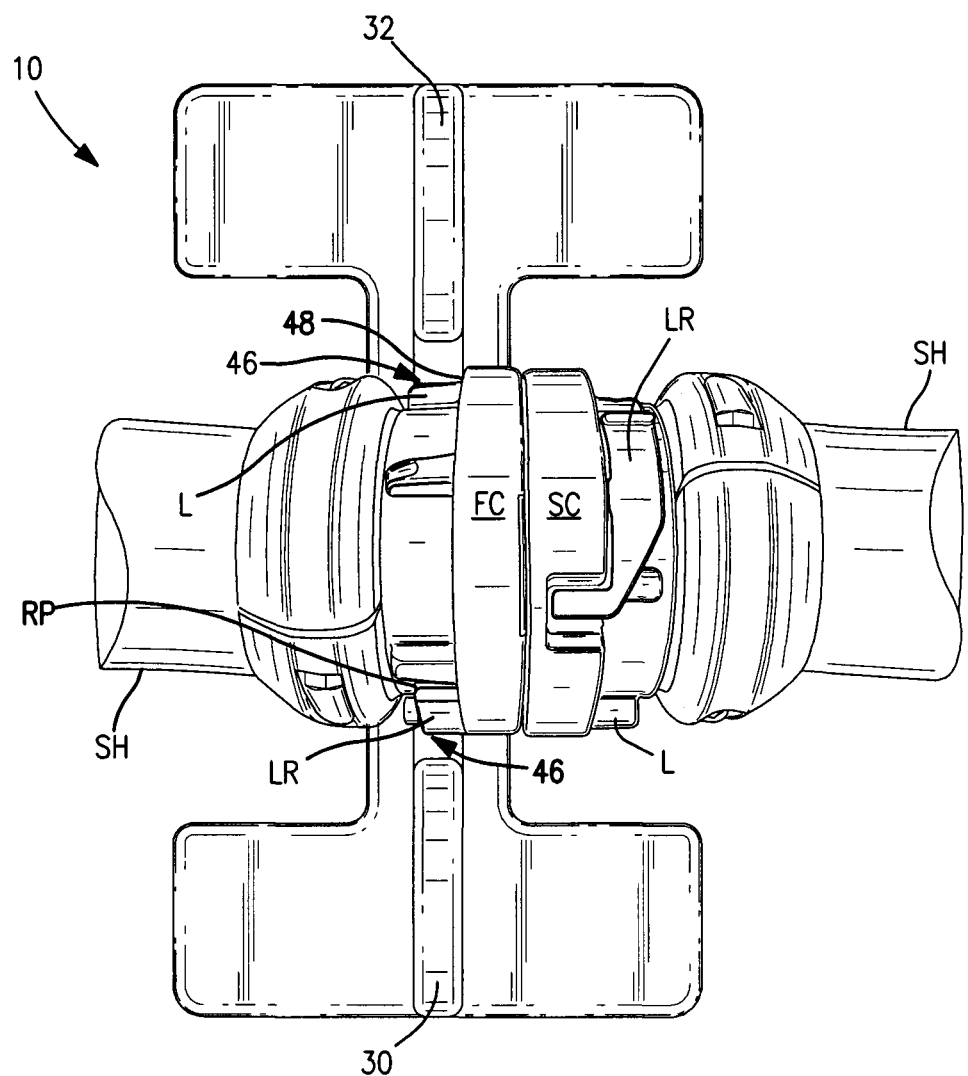
FIG. 9 shows a perspective view of the decoupler tool of FIG. 4 with a Storz coupler in the tool.
Figure 10:
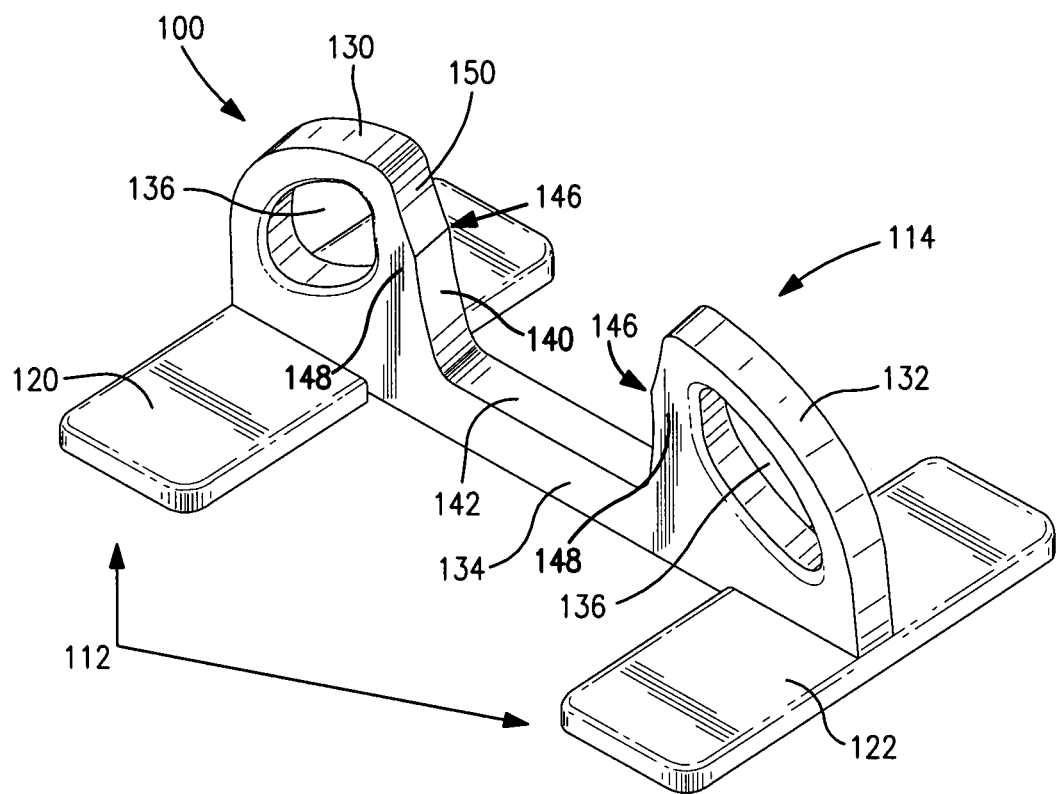
FIG. 10 shows a perspective view of another embodiment of the decoupler tool of the present invention.
Figure 11:
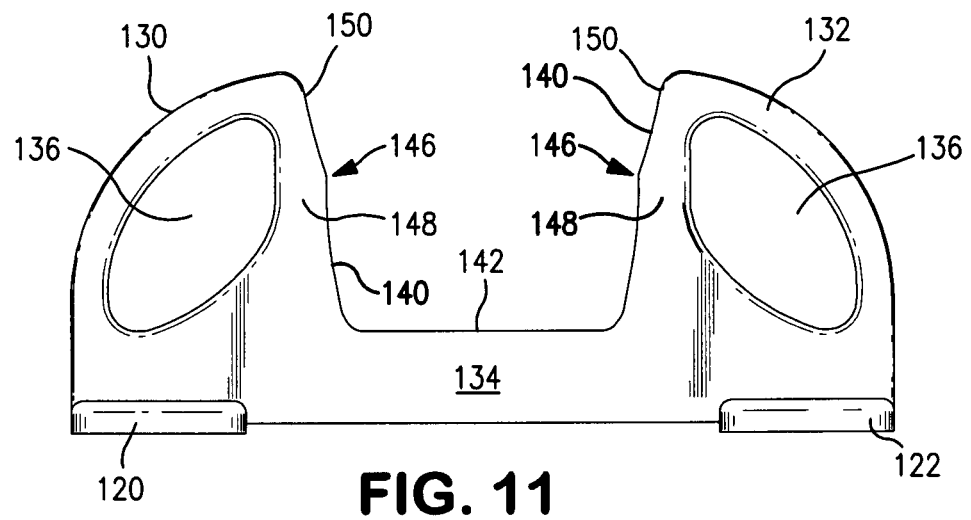
FIG. 11 shows a side view of the decoupler tool of FIG. 10.
Figure 12:
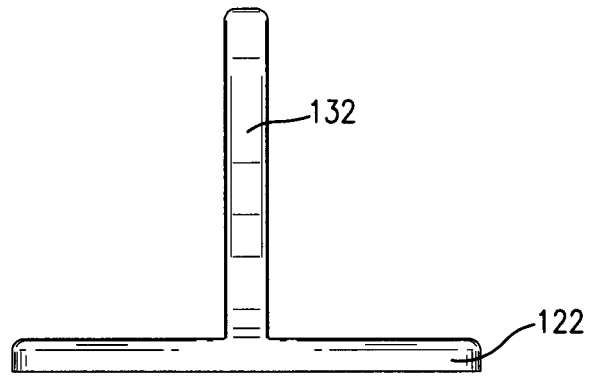
FIG. 12 shows an end view of the decoupler tool of FIG. 10.
Figure 13:
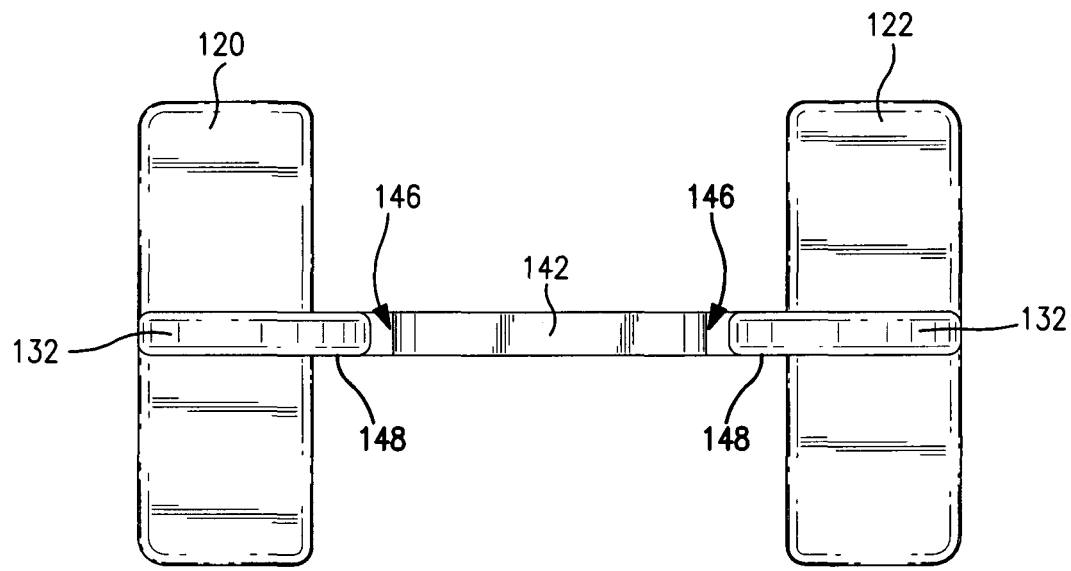
FIG. 13 shows a top view of the decoupler tool of FIG. 10.
Figure 14:
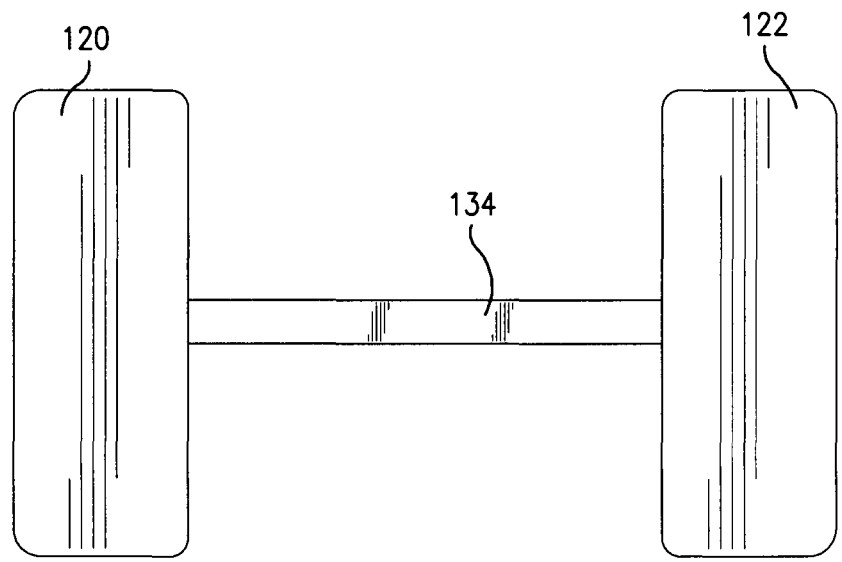
FIG. 14 shows a bottom view of the decoupler tool of FIG. 10.

The handle and decoupler 14 include a first handle 30, a second handle 32 and a support 34 for receiving and supporting a Storz coupler. Each of the handles 30 and 32 may include an opening 36 for gripping and carrying the decoupler tool 10. Each handle 30 and 32 include an inner vertical leg 40 extending upwardly from the support 34. There is a bottom member 42 between the handles for receiving a coupling of the coupler. Each leg 40 has a protrusion 46 with a center approximately 2.75 inches above the bottom base member 42 when made for use with a 4 inch diameter supply hose and approximately 3.5 inches above the bottom member 42 when made for use with a five inch diameter supply hose. One protrusion 46 may engage a lug L of the Storz coupling and the opposite protrusion 46 will engage the lock release member LR of the Storz coupling moving the locking member LR to an open or release position. More specifically, a lug L will be against the protrusion 46. Above the protrusions 46, the legs extend further outwardly as shown at 50 for ease of insertion of the coupling. The protrusions 46 engage the lock release member of a coupling member of the Storz coupler and place the lock release member in an open or release position. The larger diameter portion of the coupling will seat on a side wall area 48 of handle and decoupler 14. Referring to FIG. 9, there is shown a first coupling FC of a Storz coupler in tool 10. On one side a lug L seats against a protrusion 46; and on the other side the lock release member LR engages protrusion 46 to hold lock release member LR in an open or release position RP. The large diameter ring of the first coupling FC seats against a side portion 48 of the handle and decoupler 14. The coupling is held in place in tool 10 and will not turn based on lug L engagement against protrusion 46. A second coupling SC will be engaged by a fireman and the lock release member of the second coupling will be lifted to an open or release position and this second coupling is then rotated to decouple the coupler. It is understood that a supply line hose with a Storz coupler may be inserted in any orientation into tool 10 with the understanding that the lock release member must engage the protrusion 46 to place the lock release member in an open or release position.

The decoupler tool 10 is preferably made of aluminum. It may be made as a two-piece member having the I-shaped base 12 as a first member and the handle and decoupler portion 14 as the second member. This may be made by, for example, a CNC two-piece tool where the pieces are welded together. In the alternative, the tool may be molded as one piece. It is believed that the life span of the decoupler tool 10 may be up to ten years. The tool is simple to use and universal. There are no working parts. The tool is virtually indestructible. This is important as it is rumored that fire fighters are known to be able to break anything.

Referring generally to FIG. 9, the method of use of the decoupler tool 10 will be described. There is a Storz coupler having a first coupling FC and a second coupling SC. The Storz coupler of the supply line hose is moved to the decoupler tool 10. The Storz coupler of the supply line hose is inserted into the decoupler tool 10. A first coupling FC of the coupler is inserted into the decoupler tool 10 whereby lock release member LR of the coupling engages a protrusion 46 of the tool 10 and place the lock release member in an open or release position. Opposite the lock release member, a lug L engages leg 40 against protrusion 46. The coupler sits on bottom member 42 of support 34 of the tool. Once in place, the second coupling SC of the decoupler is grasped and the lock release member LR is lifted and this coupling is rotated to release the second coupling from the first coupling, thereby decoupling the coupler.

Referring to FIGS. 10-15, there is shown an alternate embodiment of the invention in decoupler tool 100. The decoupler tool 100 generally includes a base 112 and a handle and decoupler 114. The decoupler tool will now be described in further detail.

The base 112 includes a first end 120 and a second end 122. This embodiment differs from decoupler tool 10 in that it does not include connecting portion 24 connecting first and second ends 20 and 22 of decoupler tool 10. The manufacture of decoupler tool 100 is less expensive than decoupler tool 10 without connecting portion 24, while providing comparable support for the tool and the durability required in the field of use. Like tool 10, the base 112 will provide support for the handle and decoupler 114 and will usually be placed on the ground when using the decoupler tool.

Figure 15:
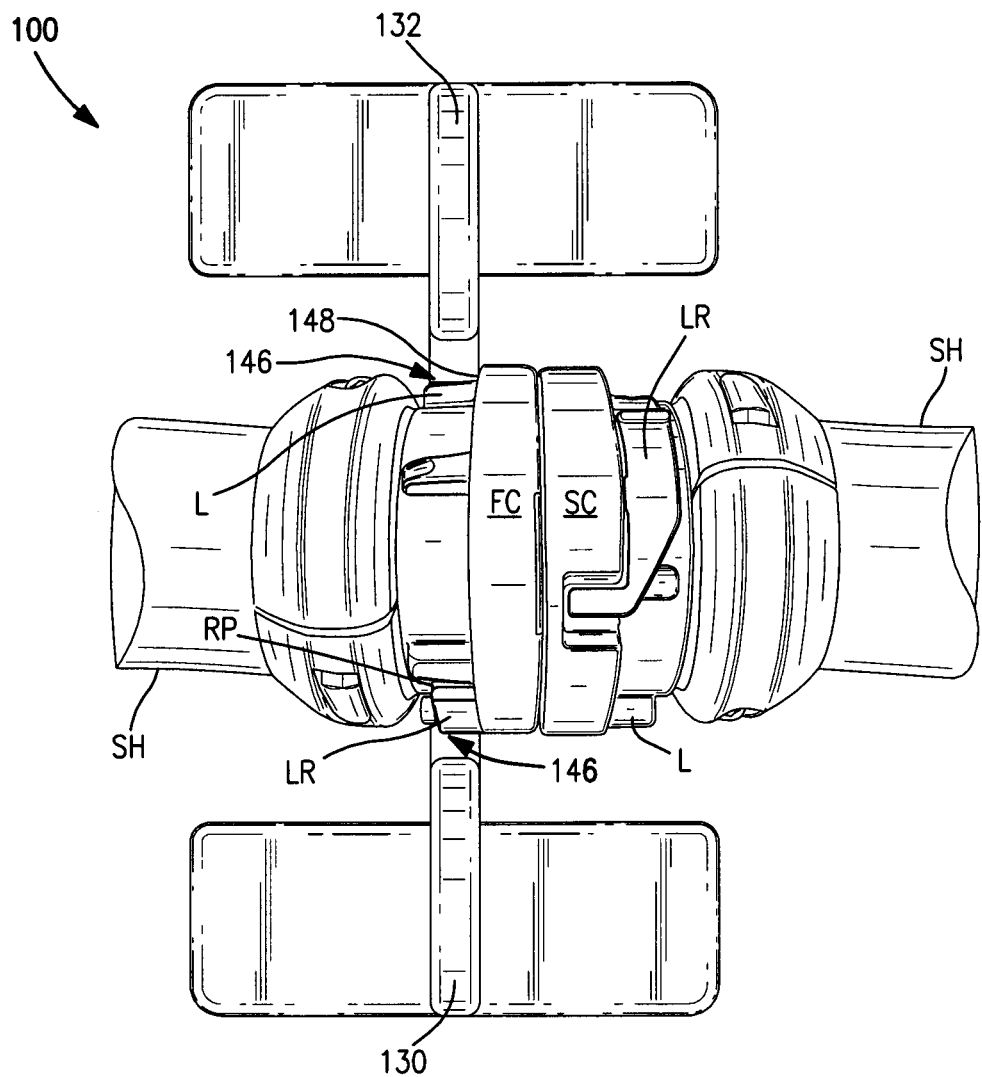
FIG. 15 shows a perspective view of the decoupler tool of FIG. 10 with a Storz coupler in the tool.

The handle and decoupler 114 include a first handle 130, a second handle 132 and a support 134 for receiving and supporting a Storz coupler. Each of the handles 130 and 132 may include an opening 136 for gripping and carrying the decoupler tool 100. Each handle 130 and 132 include an inner vertical leg 140 extending upwardly from the support 134. There is a bottom member 142 between the handles for receiving a coupling of the coupler. Each leg 140 has a protrusion 146 with a center approximately 2.75 inches above the bottom base member 142 when made for use with a 4 inch diameter supply hose and approximately 3.5 inches above the bottom member 142 when made for use with a five inch diameter supply hose. One protrusion 146 may engage a lug L of the Storz coupling and the opposite protrusion will engage the lock release member LR of the Storz coupling moving the locking member LR to an open or release position. More specifically, a lug L will be against the protrusion 146. Above the protrusions 146, the legs extend further outwardly as shown at 150 for ease of insertion of the coupling. The protrusions 146 engage the lock release member of a coupling member of the Storz coupler and place the lock release member in an open or release position. The larger diameter portion of the coupling will seat on a side wall area 148 of handle and decoupler 14. Referring to FIG. 15, there is shown a first coupling FC of a Storz coupler in tool 100. On one side a lug L seats against a protrusion 146; and on the other side the lock release member LR engages protrusion 146 to hold lock release member LR in an open or release position RP. The large diameter ring of the first coupling FC seats against a side portion 148 of the handle and decoupler 14. The coupling is held in place in tool 100 and will not turn based on lug L engagement against protrusion 146. A second coupling SC will be engaged by a fireman and the lock release member of the second coupling will be lifted to an open or release position and this second coupling is then rotated to decouple the coupler. It is understood that a supply line hose with a Storz coupler may be inserted in any orientation into tool 100 with the understanding that the lock release member must engage the protrusion 146 to place the lock release member in an open or release position.

The decoupler tool 100 is preferably made of aluminum. It may be made as a three-piece member as shown, for example, in FIG. 10 having the two-piece base 112 as first and second members and the handle and decoupler portion 114 as the third member. This may be made by, for example, a CNC three-piece tool where the pieces are welded together. In the alternative, the tool may be molded as one piece. It is believed that the life span of the decoupler tool 100 may be up to ten years. The tool is simple to use and universal. There are no working parts. The tool is virtually indestructible.

Decoupler tool 100 is shown in use in FIG. 15. The method of use is the same as referenced above in FIG. 9 and is not repeated herein.

While the primary discussion of the present invention has been directed to decoupling a Storz coupler, it is understood that the invention may be used to couple the couplings of a Storz coupler. In other words, an uncoupled first Storz coupling of a supply line hose may be inserted into the decoupler tool 10 or 100 and a second coupling of a supply line hose is then inserted into the first coupling and rotated to couple the Storz coupler.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by any appended claims.

It is claimed:

1. A decoupler tool for decoupling or coupling a Storz coupler, the Storz coupler having a first coupling and a second coupling each of said first and second couplings having a plurality of lugs and a lock release member, the decoupler tool comprising a base and a handle and decoupler attached to said base and adapted to receive the Storz coupler, the handle and decoupler extending upwardly from said base, and the handle and decoupler comprising at least two handles and at least one of said handles including a vertical leg member having a protrusion adapted to engage a lock release member of one of the couplings of the Storz coupler.

2. The decoupler tool according to claim 1 wherein the handle and decoupler comprises two handles and each of said handles includes an opening for grasping said decoupler tool and a vertical leg member having a protrusion adapted to engage a lock release member of one of the couplings of the Storz coupler.

3. The decoupler tool according to claim 2 wherein the handle and decoupler further includes a support member between each of said vertical leg members.

4. The decoupler tool according to claim 3 wherein a first of said two handles is adapted to engage a lug of one coupling and a second of said two handles is adapted to engage the lock release member of said other coupling and place the lock release member in a lock release position.

5. The decoupler tool according to claim 1 wherein the tool is adapted to receive either a four inch diameter fire hose having a Storz coupler or a five inch diameter fire hose having a Storz coupler.

6. The decoupler tool according to claim 1 wherein the base is I-shaped.

7. The decoupler tool according to claim 1 wherein the base comprises a first end member and a second end member.

8. A method of decoupling a fire hose having a Storz coupler, the Storz coupler having a first coupling and a second coupling each of said first and second couplings having a plurality of lugs and a lock release member, the decoupler tool comprising a base and a handle and decoupler attached to said base and adapted to receive the Storz coupler, the handle and decoupler extending upwardly from said base, and the handle and decoupler comprising at least two handles and at least one of said handles including a vertical leg member having a protrusion adapted to engage a lock release member of one of the couplings of the Storz coupler, comprising the steps of (a) inserting one of said first or second couplings in the decoupler tool such that said protrusion engages said lock release member and places the lock release member in a lock release position, and (b) lifting the lock release member of the other of said first or second couplings and rotating this coupling to decouple the Storz coupler.

9. The method according to claim 8 wherein the handle and decoupler comprises two handles and each of said handles includes an opening for grasping said decoupler tool and a vertical leg member having a protrusion adapted to engage a lock release member of one of the couplings of the Storz coupler.

10. The method according to claim 9 wherein the handle and decoupler further includes a support member between each of said vertical leg members.

11. The method according to claim 8 wherein the tool is adapted to receive a four inch diameter fire hose having a Storz coupler or a five inch diameter fire hose having a Storz coupler.

12. The method according to claim 8 wherein the base is I-shaped.

13. The method according to claim 8 wherein the base comprises a first end member and a second end member.

14. A decoupler tool for decoupling or coupling a Storz coupler, the Storz coupler having a first coupling and a second coupling each of said first and second couplings having a plurality of lugs and a lock release member, the decoupler tool comprising a base and a decoupler attached to said base and adapted to receive the Storz coupler, the decoupler extending upwardly from said base and comprising two vertical legs each of said vertical legs having a protrusion adapted to engage a lock release member of one of the couplings of the Storz coupler.

15. The decoupler tool according to claim 14 wherein the decoupler further includes two handles having openings therein.

16. The decoupler tool according to claim 15 wherein the handle and decoupler further includes a support member between each of said vertical leg members.

17. The decoupler tool according to claim 14 wherein the tool is adapted to receive a four inch diameter fire hose having a Storz coupler or a five inch diameter fire hose having a Storz coupler.

* * * * *